United States Patent
Hatayama et al.

(10) Patent No.: US 6,819,859 B2
(45) Date of Patent: Nov. 16, 2004

(54) PLANAR LIGHTWAVE CIRCUIT TYPE VARIABLE OPTICAL ATTENUATOR

(75) Inventors: Hitoshi Hatayama, Yokohama (JP); Chisai Hirose, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 113 days.

(21) Appl. No.: 10/196,214

(22) Filed: Jul. 17, 2002

(65) Prior Publication Data

US 2003/0016938 A1 Jan. 23, 2003

(30) Foreign Application Priority Data

Jul. 17, 2001 (JP) ........................................ 2001-216677

(51) Int. Cl.[7] ................................................ G02B 6/00
(52) U.S. Cl. ........................ 385/140; 385/14; 385/45
(58) Field of Search ............................. 385/11, 14, 15, 385/42–46, 140

(56) References Cited

U.S. PATENT DOCUMENTS 6,351,581 B1 * 2/2002 Doerr et al. .................. 385/24
2003/0180027 A1 * 9/2003 Oaknin et al. .............. 385/140

OTHER PUBLICATIONS

"Proceedings of the 2001 Institute of Electronics", Information and Communication Engineers General Conference, C–3–64, p. 229, Lower PDL of PLC Type Variable Attenuator. (Prior Art cited in the Specification. We believe that it is not necessary to prepare an English translation of this document because the contents are discussed in the specification and related to the same technique as in the following document.)

"Polarization Sensitivity of a Silica Waveguide Thermooptic Phase Shifter for Planar Lithtwave Circuits", IEEE Photonics Technology Letters, vol. 4, No. 1, Jan. 1992, pp. 36–38.

* cited by examiner

Primary Examiner—Phan T. H. Palmer
(74) Attorney, Agent, or Firm—McDermott Will & Emery LLP

(57) ABSTRACT

The invention provides a planar lightwave circuit type variable optical attenuator in which a small PDL is maintained even when an attenuation is large. The variable optical attenuator is constituted by a Mach-Zehnder interferometer comprising a substrate, two optical waveguide arms buried in a clad formed on the substrate, and thin-film heaters disposed on the surface of the clad and adjusting optical lengths of the optical waveguide arms. The optical waveguide arms are each made of a silica-based glass material, and a difference $\Delta L_0$ between arm lengths is set to be in the range of 0.38 $\mu$m to 0.52 $\mu$m.

5 Claims, 4 Drawing Sheets

PLANAR LIGHTWAVE CIRCUIT TYPE VARIABLE OPTICAL ATTENUATOR

BACKGROUND OF THE INVENTION

1. Field of the Invention

The present invention relates to a planar lightwave circuit type variable optical attenuator that utilizes a Mach-Zehnder interferometer and adjusts an optical length with a thin-film heater.

2. Description of the Related Art

In Wavelength Division Multiplexing (WDM) optical communication, optical signals emitted from a plurality of light sources and having different wavelengths in the band of 1.55 μm are transmitted through a single optical fiber transmission line and received by light receivers allocated for each wavelength, thereby realizing large-capacity optical communication. Respective powers of the optical signals at the light receivers are required to be equal to one another. A variable optical attenuator is necessary to meet that requirement.

As variable optical attenuators, there are known a planar lightwave circuit type utilizing a Mach-Zehnder interferometer and adjusting an optical length with a thin-film heater, a bulk type optical system in which an optical filter is driven by a stepping motor, and a bulk type optical system utilizing a Faraday rotator. Of those variable optical attenuators, the planar lightwave circuit type has many advantages over the other types: it can be downsized through integration and is superior in productivity for mass production, and it has smaller loss.

FIG. 1 shows a conventional planar lightwave circuit type variable optical attenuator 1. The illustrated variable optical attenuator 1 includes a Mach-Zehnder interferometer 101 comprising two optical waveguide arms 10, 20 buried in a clad 70 formed on a substrate 100, and two directional couplers 50, 51 for coupling the optical waveguide arms 10, 20 together at their both end. A thin-film heater 110 is disposed, extending along the optical waveguide arm 10, on the surface of the clad 70. In FIG. 1, "$I_{in}$" represents an input optical power, and "$I_{out}$" represents an output optical power.

An electric power W supplied to the thin-film heater 110 is controlled by a control unit 200 for adjusting the temperature of the thin-film heater 110. Upon heating of the thin-film heater 110, the temperature of the optical waveguide arm 10 rises and the refractive index of the optical waveguide arm 10 changes with the thermooptic effect. As a result, a difference in optical length between the optical waveguide arms 10 and 20 is also changed, whereby the output optical power $I_{out}$ can be varied according to the optical interference.

A difference $\Delta L_0$ between the arm lengths under a condition in which no electric power is supplied to the thin-film heater 110, is set to zero or $\lambda_0/2n_{eff}$ ($\lambda_0$ is the central wavelength of an operating wavelength band and $n_{eff}$ is the effective refractive index of the optical waveguide) corresponding to a phase difference 180°. When the arm length difference $\Delta L_0$ is zero, the input optical power is output to an output port positioned in a diagonal relation to an input port. When the arm length difference $\Delta L_0$ is $\lambda_0/2n_{eff}$, the input optical power is output to the output port positioned on the same side as the input port.

When the thin-film heater is disposed on the clad, the optical waveguide arm is susceptible to thermal stress in the vertical direction because of a difference in thermal expansion coefficient between the core and the clad. The thermal stress generates double refraction in the optical waveguide arm because of photoelasticity and hence increases polarization dependence of optical characteristics. In the optical attenuator of FIG. 1, for example, as the heating temperature of the thin-film heater 110 rises, a larger attenuation is obtained, but a Polarization Dependent Loss (PDL) is also increased at the same time.

With respect to such problem, a reference "Proceedings of the 2001 Institute of Electronics, Information and Communication Engineers General Conference, C-3-64, p. 229, Lower PDL of PLC Type Variable Attenuator" describes a technique for reducing the PDL by means of thermal stress releasing grooves formed on both sides of an optical waveguide arm.

SUMMARY OF THE INVENTION

It is an object of the present invention to provide a planar lightwave circuit type variable optical attenuator in which a small PDL is maintained even when attenuation is large.

To achieve the above object, the present invention provides a planar lightwave circuit type variable optical attenuator including a Mach-Zehnder interferometer formed on a substrate. The Mach-Zehnder interferometer comprises two optical waveguide arms formed on the substrate, and thin-film heaters formed respectively over the two optical waveguide arms, the two optical waveguide arms having lengths not equal to each other.

Assuming that an effective refractive index of the optical waveguide arms is $n_{eff}$ and a central wavelength of an operating wavelength band is $\lambda_0$, a difference $\Delta L_0$ between the lengths of the two optical waveguide arms may satisfy the following relationship:

$$0.36 \times \lambda_0/n_{eff} \leq \Delta L_0 \leq 0.47 \times \lambda_0/n_{eff}$$

An attenuation may be in the range of 7 to 21 dB when no electric powers are supplied to the thin-film heaters for adjusting the optical lengths of the optical waveguide arms. Plural sets of Mach-Zehnder interferometers may be formed on the substrate in parallel.

The present invention is further explained below by referring to the accompanying drawings. The drawings are provided solely for the purpose of illustration and are not intended to limit the scope of the invention.

DESCRIPTION OF THE PREFERRED EMBODIMENTS

Figure 1A:
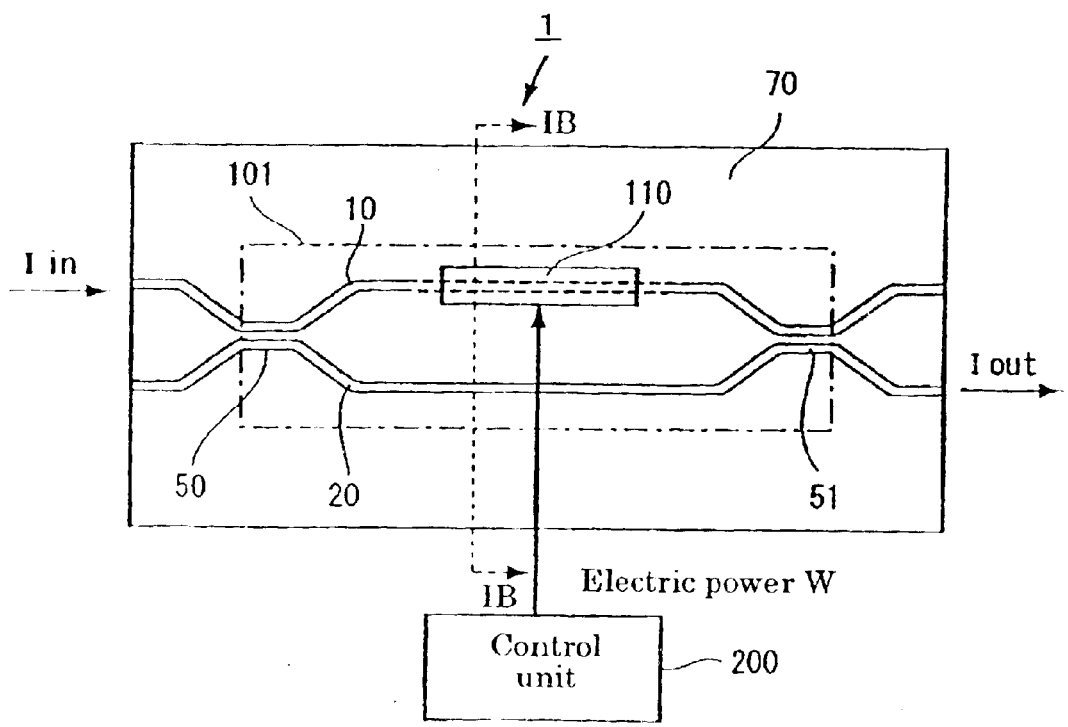
FIG. 1A is a plan view showing a conventional planar lightwave circuit type variable optical attenuator.
Figure 1B:
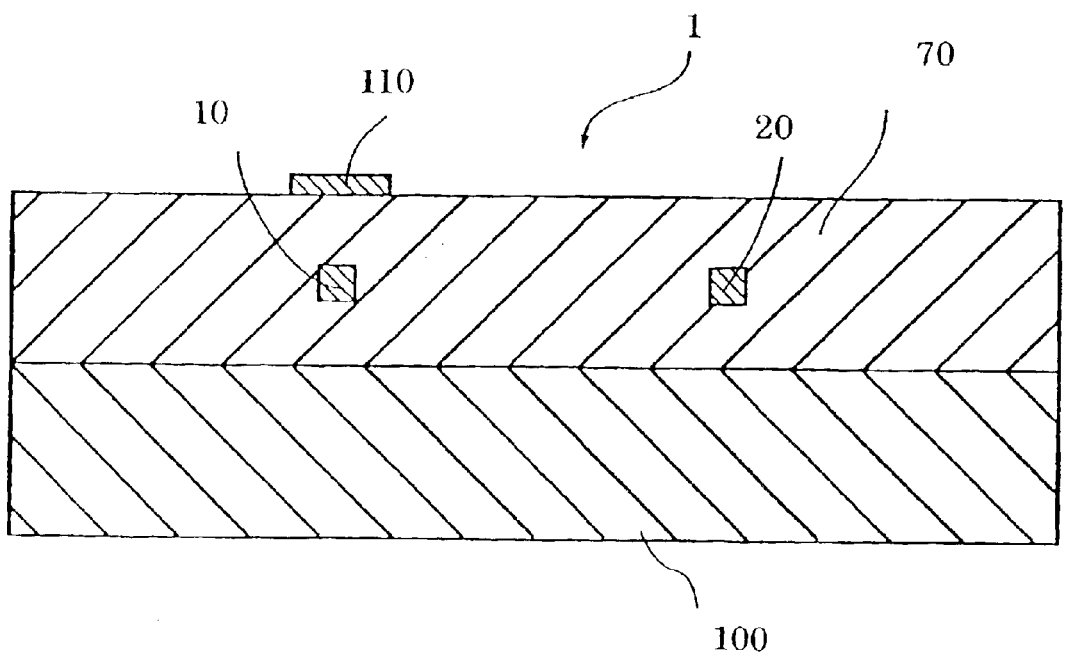
FIG. 1B is a sectional view taken along a broken line IB in FIG. 1A.

Embodiments of the present invention are explained below by referring to the accompanying drawings. In the drawings, the same number refers to the same part to avoid duplicate explanation. The ratios of the dimensions in the drawings do not necessarily coincide with the explanation.

To begin with, an attenuation ATT(W) in a condition of an electric power W being applied to a thin-film heater is defined as expressed by the following Eq. (1);

$$ATT(W)(dB) = -10 \log(I_{out}/I_{in}) - L_{min} \quad (1)$$

where $L_{min}$ represents a minimum loss value of an optical attenuator and is determined mainly depending on scattering losses of optical waveguides that constitute a Mach-Zehnder interferometer.

The inventors have conducted intensive studies on the relationship between an attenuation and a PDL using a planar lightwave circuit type variable optical attenuator constituted by a Mach-Zehnder interferometer in which two thin-film heaters are provided respectively over two optical waveguide arms. As a result, the inventors have found that there is an optimum range of a difference $\Delta L_0$ between the arm lengths in which the PDL is not increased even when the attenuation is large.

Figure 2A:
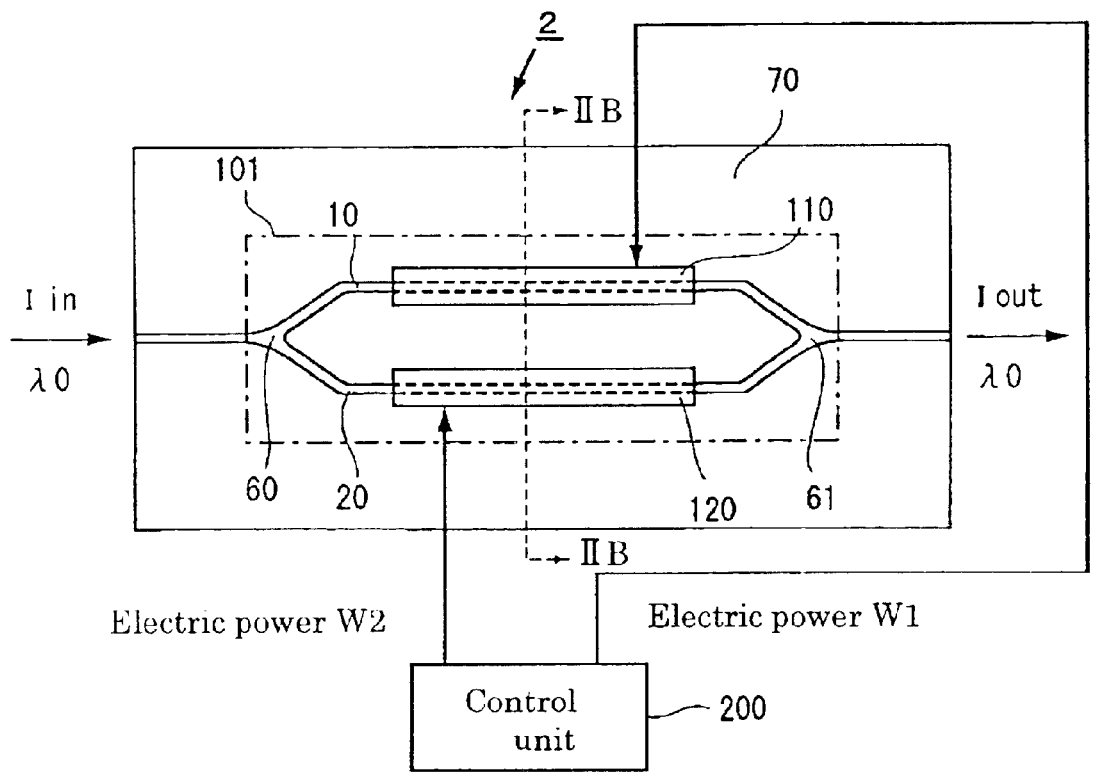
FIG. 2A is a plan view showing a first embodiment of a planar lightwave circuit type variable optical attenuator of the present invention.
Figure 2B:
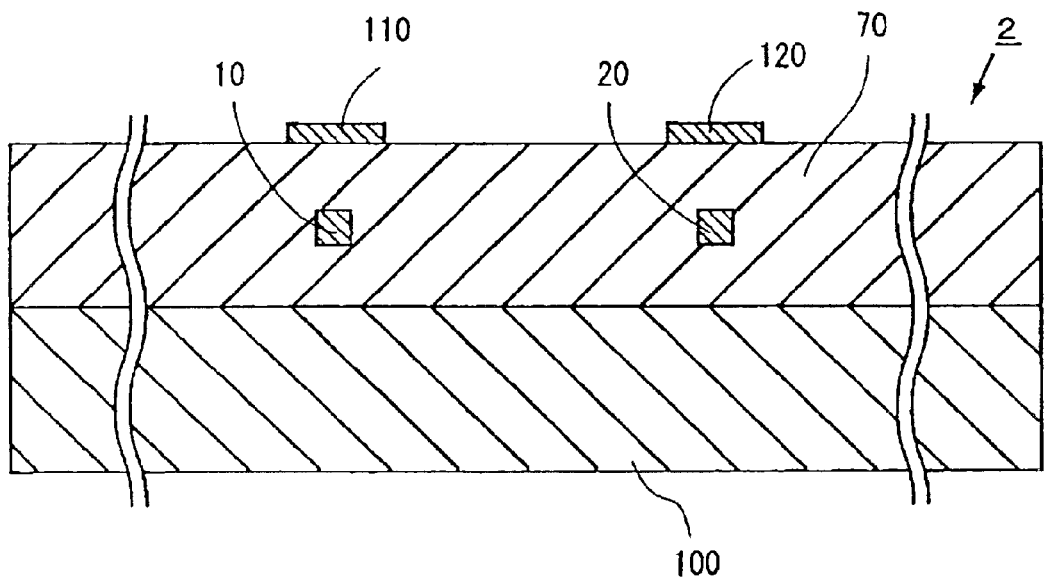
FIG. 2B is a sectional view taken along a broken line IIB in FIG. 2A.

FIG. 2A is a plan view showing a first embodiment of a planar lightwave circuit type variable optical attenuator of the present invention. The illustrated variable optical attenuator 2 is constituted by a Mach-Zehnder interferometer 101 comprising two optical waveguide arms 10, 20 buried in a clad 70 formed on a substrate 100 and having a difference $\Delta L_0$ between the lengths of the arms at an effective refractive index $n_{eff}$, and the two Y-branched couplers 60, 61 for coupling the optical waveguide arms 10, 20 to each other at their both end. Also, thin-film heaters 110, 120 are disposed, extending along the optical waveguide arms 10, 20, on the surface of the clad 70. Electric powers $W_1$, $W_2$ are supplied respectively to the thin-film heaters 110, 120 through a control unit 200 for adjusting respective temperatures $T_1$, $T_2$ of the optical waveguide arms 10, 20. FIG. 2B is a sectional view taken along a broken line IIB in FIG. 2A.

The variable optical attenuator 2 is manufactured, by way of example, as follows. An under-clad layer is formed on the substrate 100 made of silica glass, and a core layer is formed on the under-clad layer. The core layer has a thickness of about 7 μm and is made of silica glass added with $GeO_2$ so as to have a specific refractive index difference of about 0.45%. Thereafter, a core shape pattern is formed by photolithography and reactive ion etching. Then, an over-clad layer is formed in thickness of about 30 μm. Subsequently, after vapor-phase-depositing a chromium thin film on the entire surface of the over-clad layer, the thin-film heaters 110, 120 are formed respectively over the optical waveguide arms 10, 20 by photolithography and reactive ion etching. The thin-film heaters 110, 120 are connected to the control unit 200 so that the powers can be supplied to the thin-film heaters 110, 120.

Figure 3:
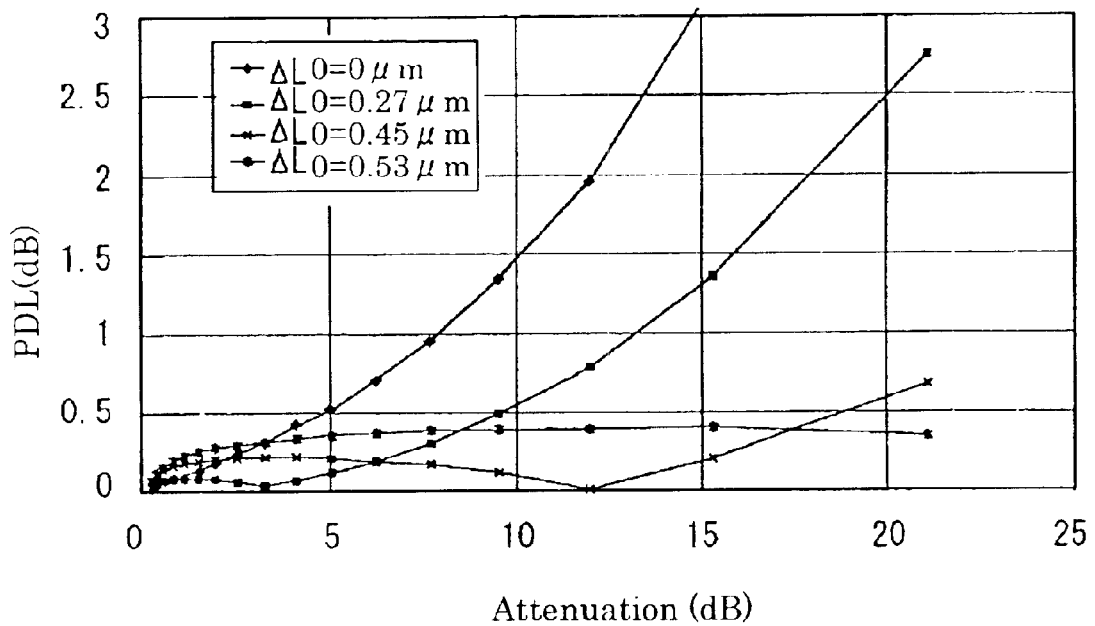
FIG. 3 is a graph showing the results obtained by calculation with respect to the relationship between an attenuation and a PDL when a difference $\Delta L_0$ between arm lengths of the variable optical attenuator shown in FIG. 2A is changed.

FIG. 3 is a graph showing the results obtained by calculation made on the relationship between an attenuation and a PDL in the optical attenuators in which the arm length difference $\Delta L_0$ is set to 0 μm, 0.27 μm, 0.45 μm and 0.53 μm. In the calculation, it is assumed that the material of each optical waveguide arm is silica-based glass and the effective refractive index $n_{eff}$ is 1.45. When the arm length difference $\Delta L_0$ is 0 μm, PDL increases in accordance with the increase in the attenuation. When the arm length difference $\Delta L_0$ is 0.27 μm, the tendency of the PDL to increase is moderated, and at the same time there occurs a condition in which the PDL becomes zero at a specific value of the attenuation ATT. When the arm length difference $\Delta L_0$ is 0.45 μm or 0.53 μm, the tendency of the PDL to increase is further moderated. For example, when the difference $\Delta L_0$ is 0.45 μm, a value of the attenuation ATT at which the PDL becomes zero is increased in comparison with the case in which the difference $\Delta L_0$ is 0.27 μm. When the difference $\Delta L_0$ is 0.53 μm, a value of the attenuation ATT at which the PDL becomes zero exceeds 20 dB and does not lie in the graph area.

Figure 4:
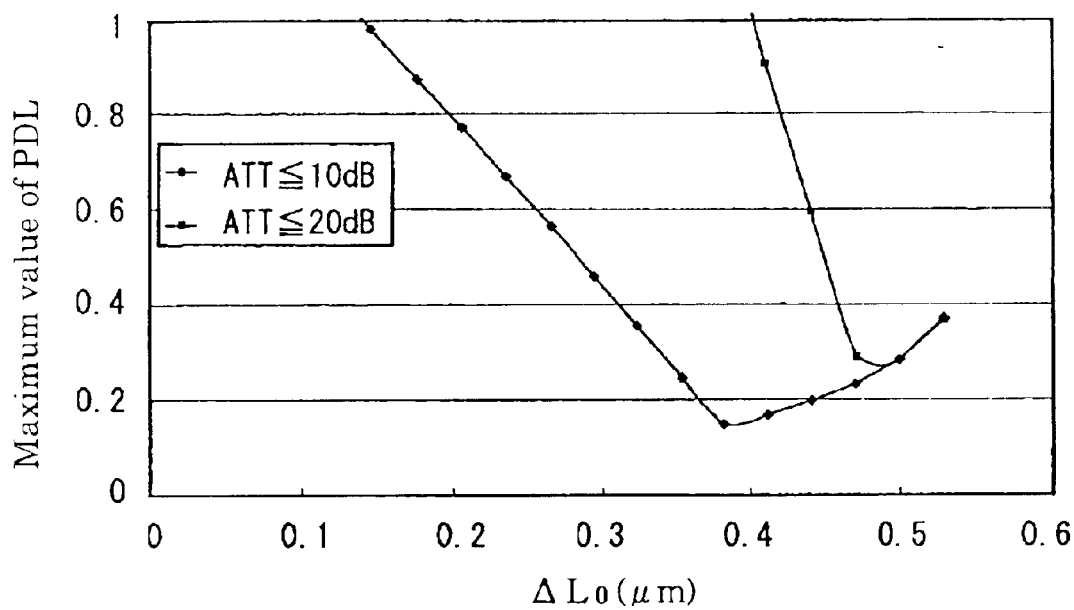
FIG. 4 is a graph showing the results obtained by calculation with respect to the relationship between the arm length difference $\Delta L_0$ and a maximum value of the PDL when the attenuation is within a certain range in the variable optical attenuator shown in FIG. 2A.

FIG. 4 is a graph showing the results obtained by calculation made on the relationship between the arm length difference $\Delta L_0$ and a maximum value of the PDL when the wavelength used is 1.55 μm and the attenuation ATT is within a certain range. The calculation was made for two cases in which the attenuation ATT was set to the range of not more than 10 dB and the range of not more than 20 dB. In either case, the maximum value of the PDL is minimized at a specific value of the arm length difference $\Delta L_0$. When the attenuation ATT is set to the range of not more than 10 dB, the PDL can be held down to a minimum value by setting the arm length difference $\Delta L_0$ to 0.38 μm. Also, when the attenuation ATT is set to the range of not more than 20 dB, the PDL can be held down to a minimum value by setting the arm length difference $\Delta L_0$ to 0.52 μm. Since an optical attenuator with an attenuation variable in the range of 0 to 20 dB is employed in practical WDM optical communication, the optimum region of the arm length difference $\Delta L_0$ is from 0.38 to 0.52 μm.

In the case in which the central wavelength $\lambda_0$ of an operating wavelength band is 1.3 μm, the PDL can be held down to a minimum value by setting the arm length difference $\Delta L_0$ to 0.32 μm when the attenuation ATT is set to the range of not more than 10 dB, and it can be held down to a minimum value by setting the arm length difference $\Delta L_0$ to 0.42 μm when the attenuation ATT is set to the range of not more than 20 dB. In practical WDM optical communication, the optimum region of the arm length difference $\Delta L_0$ is from 0.32 to 0.42 μm.

Next, the optimum region of the arm length difference $\Delta L_0$ for holding the PDL within a low range is derived with respect to general parameters, i.e., the effective refractive index $n_{eff}$ and the central wavelength $\lambda_0$ of an operating wavelength band. In a Mach-Zehnder interferometer, the relationship expressed by the following Eq. (2) holds among a phase difference $\Delta\Phi$ caused between the two optical waveguide arms, the effective refractive index $n_{eff}$, the central wavelength $\lambda_0$ of the operating wavelength band, and the arm length difference $\Delta L_0$:

$$\Delta L_0 = \Delta\Phi / 2\pi \times \lambda_0 / n_{eff} \quad (2)$$

Equation (2) represents the relationship between $\Delta L_0$ and $\lambda_0/n_{eff}$, and the proportional constant between them can be calculated using numerical values obtained from the calculation described above. As a result, the optimum region of the arm length difference $\Delta L_0$ for holding the PDL within a low range is derived as being from $0.36 \times \lambda_0/n_{eff}$ to $0.47 \times \lambda_0/n_{eff}$.

Figure 5:
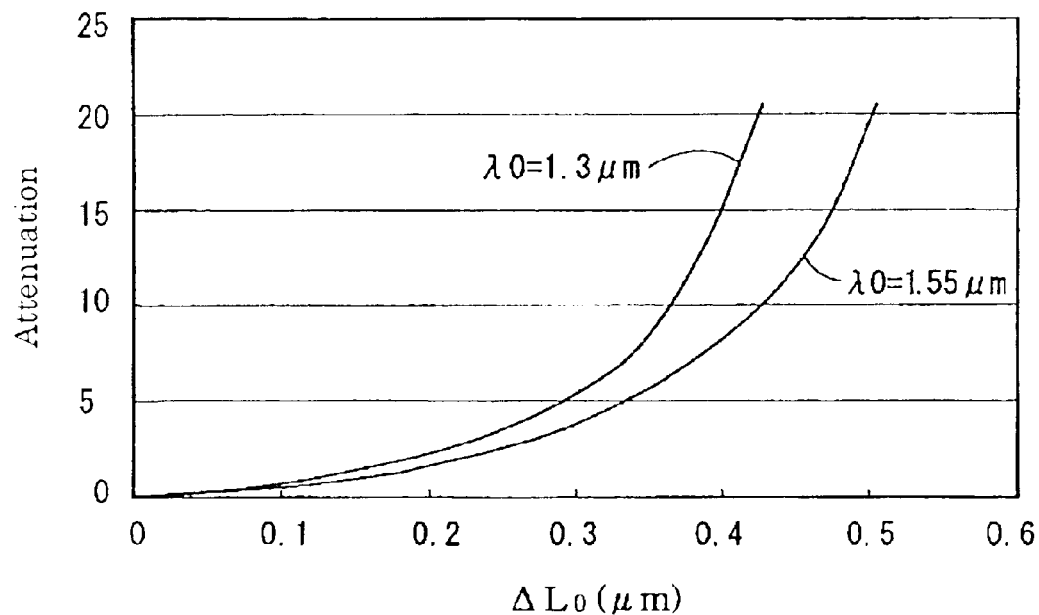
FIG. 5 is a graph showing the results obtained by calculation with respect to the relationship between the arm length difference $\Delta L_0$ and the attenuation when no electric powers are supplied to thin-film heaters in the variable optical attenuator shown in FIG. 2A.

FIG. 5 is a graph showing the relationship between the arm length difference $\Delta L_0$ and the attenuation ATT(0,0) in a condition under which no electric powers are supplied to the thin-film heaters 110, 120. As the arm length difference $\Delta L_0$ increases, the attenuation ATT(0,0) also increases. More specifically, it is seen that the arm length difference $\Delta L_0$ of 0.38 to 0.52 μm, which is the optimum region when the central wavelength $\lambda_0$ of the operating wavelength band is 1.55 μm, corresponds to the attenuation of 7 to 21 dB. Also, the arm length difference $\Delta L_0$ of 0.32 to 0.42 μm, which is the optimum region when the central wavelength $\lambda_0$ of the operating wavelength band is 1.3 μm, corresponds to the attenuation of 7 to 21 dB similarly.

Thus, by providing the thin-film heaters respectively over two optical waveguide arms that constitute a Mach-Zehnder interferometer, and causing the two optical waveguide arms to have a difference between arm lengths, a predetermined value of attenuation is obtained when no electric powers are supplied to the thin-film heaters. Then, by heating the thin-film heater on the side of the optical waveguide arm having a longer optical length, the larger attenuation ATT can be obtained, and by heating the thin-film heater on the side of the optical waveguide arm having a shorter optical length, the smaller attenuation ATT can be obtained. Even in a condition in which the attenuation ATT is relatively large, the heating temperatures $T_1$, $T_2$ of the two thin-film heaters can be set to have a smaller difference between them. Consequently, a difference between thermal stresses imposed on the two optical waveguide arms is suppressed and the polarization dependence of optical characteristics is reduced.

In the variable optical attenuator described in the reference cited in the Related Art, in order to release thermal stress sufficiently, grooves formed on both sides of an optical waveguide arm are required to have a depth extending from the clad surface to near the boundary between the clad and the substrate. In general lightwave circuits, that depth is about 20 to 50 μm. Usually, the grooves are formed by etching after forming the over-clad layer, and the process of forming the grooves in that depth requires as long as about 5 to 10 hours under a usual etching rate. Further, because portions of the optical waveguide arm are exposed in a three direction, the mechanical strength is reduced in those exposed portions, and the optical waveguide arm is apt to break.

On the other hand, in this embodiment, since there is no need of etching to form the grooves on both sides of the optical waveguide arm, problems such as requiring a long working time and causing a reduction of the mechanical strength are eliminated.

Figure 6:
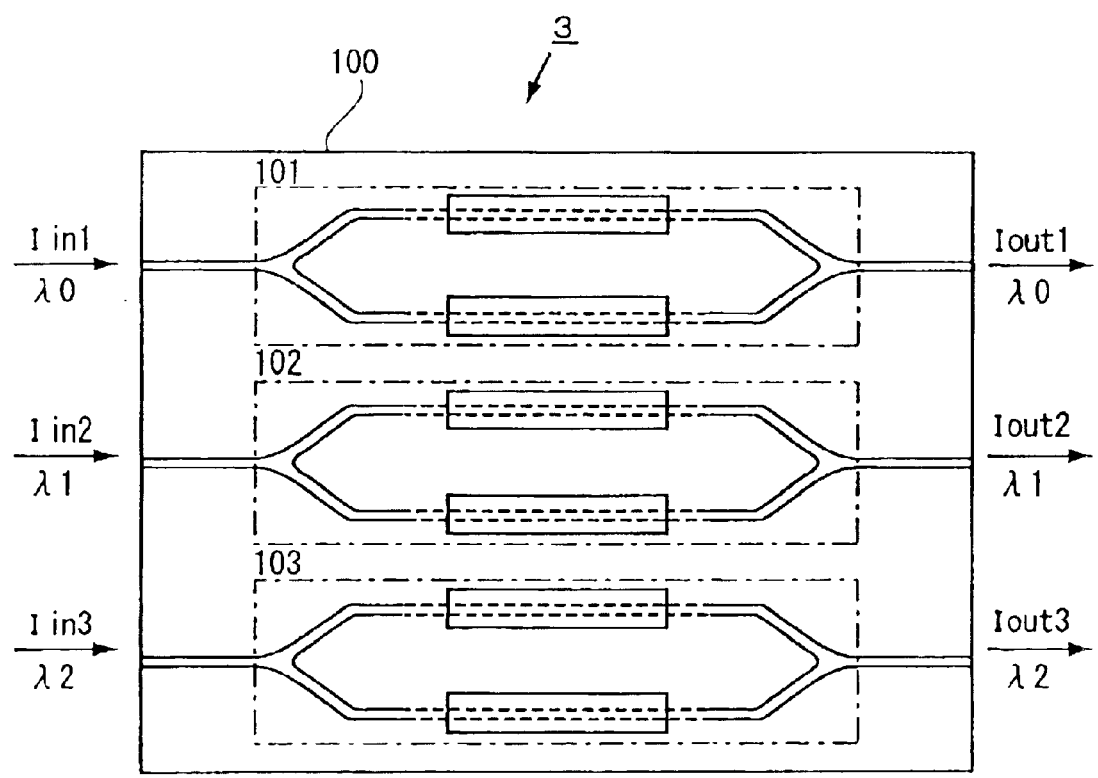
FIG. 6 is a plan view showing a second embodiment of the planar lightwave circuit type variable optical attenuator according to the present invention.

FIG. 6 is an overall plan view of a planar lightwave circuit type variable optical attenuator 3 as a second embodiment according to the present invention. Plural sets of Mach-Zehnder interferometers 101, 102 and 103 each having the construction shown in FIG. 2 are formed in parallel on a single substrate 100. With such an arrangement, a small-sized variable optical attenuator having the variable attenuating function for each of the optical powers $I_{in1}$, $I_{in2}$ and $I_{in3}$ of plural channels can be obtained.

While the optical attenuators of FIGS. 2 and 6 employ the Y-branched couplers as optical couplers in the Mach-Zehnder interferometer, directional couplers are also applicable to a Mach-Zehnder interferometer.

The substrate used for forming a lightwave circuit can, in place of silica glass, be made of silicon, alumina, multi-component glass, or the like on each of which a glass thin film is formed as an upper layer. Also, the optical waveguide arm made of a core and a clad can be formed using any suitable semiconductor- or polymer-based material in place of silica glass. Further, tantalum nitride is usable in place of chromium as the material of the thin-film heater. A Peltier device may be used instead of the thin-film heater as a thermooptic phase shifter.

What is claimed is:

1. A planar lightwave circuit type variable optical attenuator including a Mach-Zehnder interferometer formed on a substrate, said Mach-Zehnder interferometer comprising:

two optical waveguide arms formed on said substrate; and thin-film heaters formed respectively over said two optical waveguide arms, said two optical waveguide arms having lengths not equal to each other, wherein assuming that an effective refractive index of said optical waveguide arms is $n_{eff}$, a difference between the lengths of said optical wave guide arms is $\Delta L_0$, and a central wavelength of an operating wavelength band is $\lambda_0$, the following relationship is satisfied:

$$0.36 \times \lambda_0/n_{eff} \leq \Delta L_0 \leq 0.47 \times \lambda_0/n_{eff}.$$

2. A planar lightwave circuit type variable optical attenuator including a Mach-Zehnder interferometer formed on a substrate, said Mach-Zehnder interferometer comprising:

two optical waveguide arms formed on said substrate; and thin-film heaters formed respectively over said two optical waveguide arms, said two optical waveguide arms having lengths not equal to each other, wherein said optical waveguide arms are formed of silica glass, and the difference between the lengths of said optical waveguide arms is set to be in the range of 0.38 μm to 0.52 μm.

3. A planar lightwave circuit type variable optical attenuator including a Mach-Zehnder interferometer formed on a substrate, said Mach-Zehnder interferometer comprising:

two optical waveguide arms formed on said substrate; and thin-film heaters formed respectively over said two optical waveguide arms, said two optical waveguide arms having lengths not equal to each other, wherein said optical waveguide arms are formed of silica glass, and the difference between the lengths of said optical waveguide arms is set to be in the range of 0.32 μm to 0.42 μm.

4. A planar lightwave circuit type variable optical attenuator including a Mach-Zehnder interferometer formed on a substrate, said Mach-Zehnder interferometer comprising:

two optical waveguide arms formed on said substrate; and thin-film heaters formed respectively over said two optical waveguide arms, said two optical waveguide arms having lengths not equal to each other, wherein an attenuation is in the range of 7 to 21 dB when no electric powers are supplied to said thin-film heaters.

5. A planar lightwave circuit type variable optical attenuator according to any one of claims 1, 2, 3 and 4, wherein plural sets of said Mach-Zehnder interferometer are provided in parallel on said substrate.

* * * * *